United States Patent [19]

Botterman et al.

[11] 4,378,877

[45] Apr. 5, 1983

[54] REUSABLE ENCLOSED CARRIER CARTON

[75] Inventors: David L. Botterman; Natalie A. Wolff, both of Arlington, Tex.

[73] Assignee: Container Corporation of America, Chicago, Ill.

[21] Appl. No.: 253,250

[22] Filed: Apr. 13, 1981

[51] Int. Cl.³ .................. B65D 65/28; B65D 75/08; B65D 5/54

[52] U.S. Cl. .................. 206/141; 206/155; 206/427; 206/634; 229/40

[58] Field of Search ............. 206/167, 427, 624, 634, 206/628, 626, 141, 45.31, 140, 147, 149, 155, 162, 614; 229/52 BC, 40

[56] References Cited

U.S. PATENT DOCUMENTS

| Re. 27,624 | 4/1973 | Helms | 229/37 R |
|---|---|---|---|
| 3,181,727 | 5/1965 | Graser et al. | 206/155 |
| 3,186,545 | 6/1965 | Conrades | 206/155 |
| 3,217,924 | 11/1965 | Chidsey, Jr. | 206/155 |
| 3,270,914 | 9/1966 | Graser | 206/140 |
| 3,294,280 | 12/1966 | Graser | 206/155 |
| 3,309,005 | 3/1967 | Pilger | 206/628 |
| 3,348,672 | 10/1967 | Brown | 206/197 |
| 3,355,089 | 11/1967 | Champlin | 206/612 |
| 3,403,839 | 10/1968 | Farquhar | 229/40 |
| 3,554,402 | 1/1971 | Lock | 206/192 |
| 3,578,238 | 5/1971 | Schillinger et al. | 229/40 |
| 3,627,193 | 12/1971 | Helms | 229/37 R |
| 3,670,950 | 6/1972 | Rossi | 229/40 |
| 3,688,972 | 9/1972 | Mahon | 206/612 |
| 3,692,232 | 9/1972 | Helms | 229/52 B |
| 3,696,990 | 10/1972 | Dewhurst | 229/37 R |
| 3,712,533 | 1/1973 | Skillen | 206/628 |
| 3,904,036 | 9/1975 | Forrer | 206/427 |
| 3,986,658 | 10/1976 | Arneson et al. | 229/40 |
| 4,256,226 | 3/1981 | Stone | 229/52 BC |

Primary Examiner—William T. Dixson, Jr.
Assistant Examiner—Brenda J. Ehrhardt
Attorney, Agent, or Firm—Richard W. Carpenter; Davis Chin

[57] ABSTRACT

A fully enclosed carrier carton for bottles or the like having removable portions to provide access to the contents of the carton without destroying the integrity of the carton for reuse.

4 Claims, 7 Drawing Figures

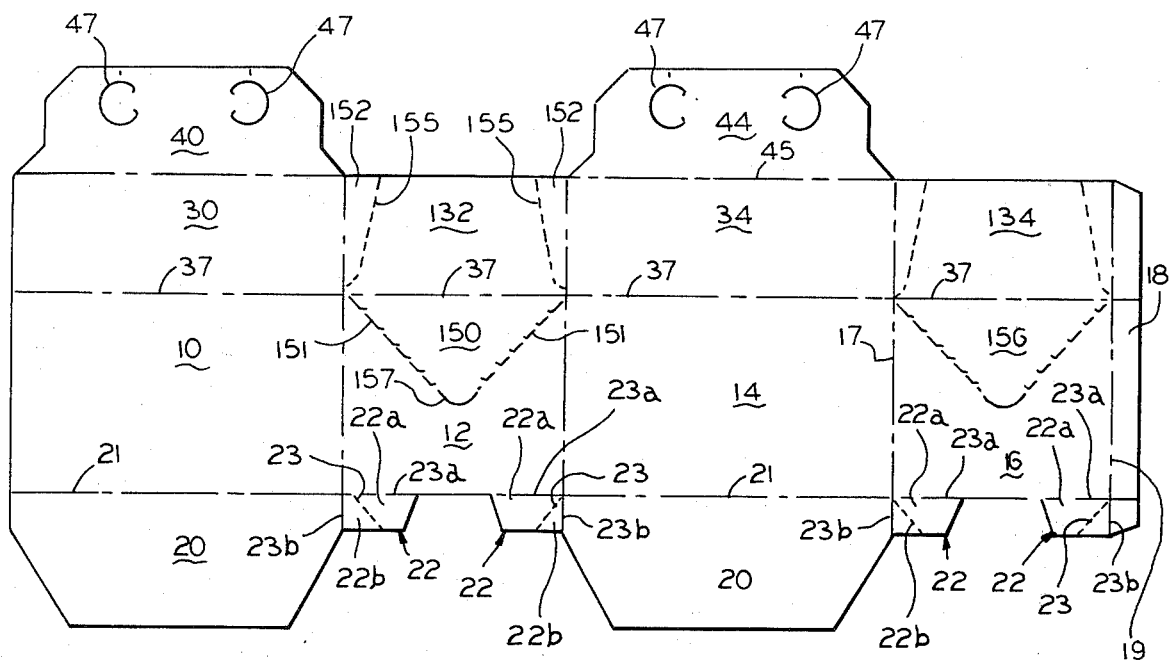
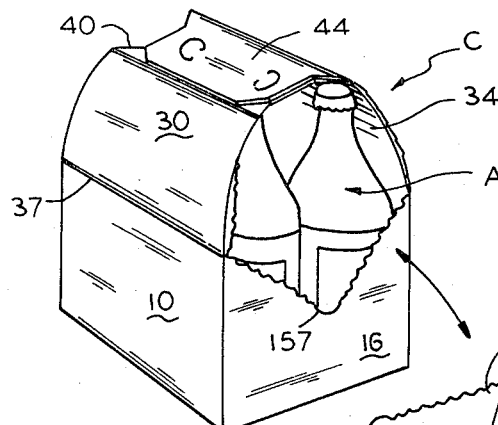
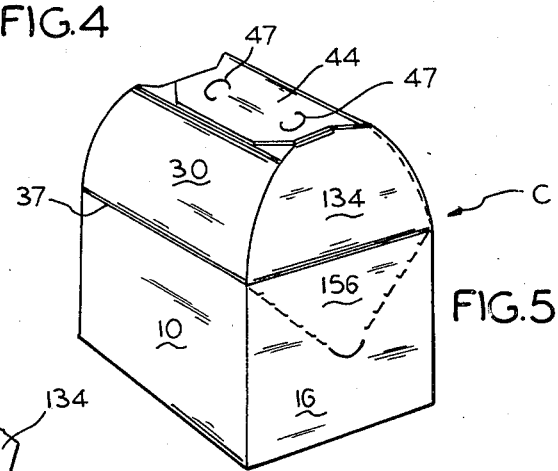
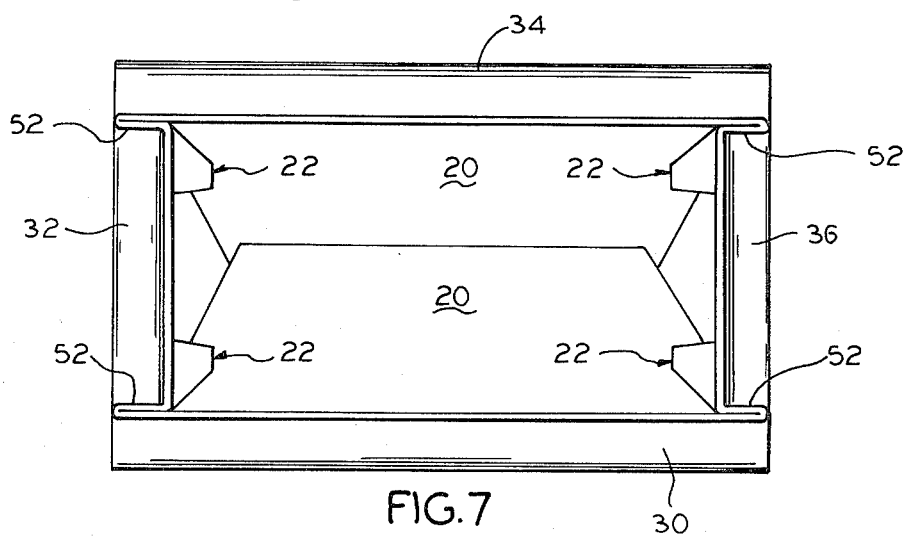

REUSABLE ENCLOSED CARRIER CARTON

BACKGROUND OF THE INVENTION

1. Field of the Invention

This invention relates to carrier cartons for bottles of the like and more particularly to an enclosed carbon having portions which are detachable to provide access to the interior of the carton without destroying the integrity of the carton and preventing its reuse.

2. Description of the Prior Art

A state of the art search directed to the subject matter of this application uncovered the following U.S. Pat. Nos.: Re. 27,624; 3,004,036; 3,181,727; 3,186,545; 3,217,924; 3,270,914; 3,294,280; 3,309,005; 3,348,672; 3,355,089; 3,403,839; 3,405,332; 3,554,402; 3,578,238; 3,627,193; 3,670,950; 3,688,972; 3,692,232; 3,696,990; 3,712,533; 3,986,658; 4,029,207; 4,155,449.

None of the prior art patents uncovered in the search disclose a completely enclosed carrier carton having portions of end walls which are removable in such a manner as to preserve the integrity of the carton for its reuse.

SUMMARY OF THE INVENTION

An object of the invention is to provide a paperboard carrier carton for bottles or the like which is completely enclosed to shield the contents of the carton from the light and which also has sections which are detachable from the remaining portions of the carton to provide access to the contents without destroying the integrity of the carbon and preventing its reuse.

A more specific object of the invention is the provision, in a carton of the type described, of end wall sections which are detachable to provide access to the interior of the carton.

These and other objects of the inventions will be apparent from an examination of the following description and drawings.

BRIEF DESCRIPTION OF THE DRAWINGS

FIGS. 4–6 are views similar to FIGS. 1–3, but illustrating a modified form of the invention.

FIG. 7 is a horizontal cross-sectional view taken along the lines 7—7 of FIG. 2.

It will be understood that, for purposes of clarity, certain elements may have been intentionally omitted from certain views where they are believed to be illustrated to better advantage in other views.

DESCRIPTION OF THE PREFERRED EMBODIMENT

Figure 1:
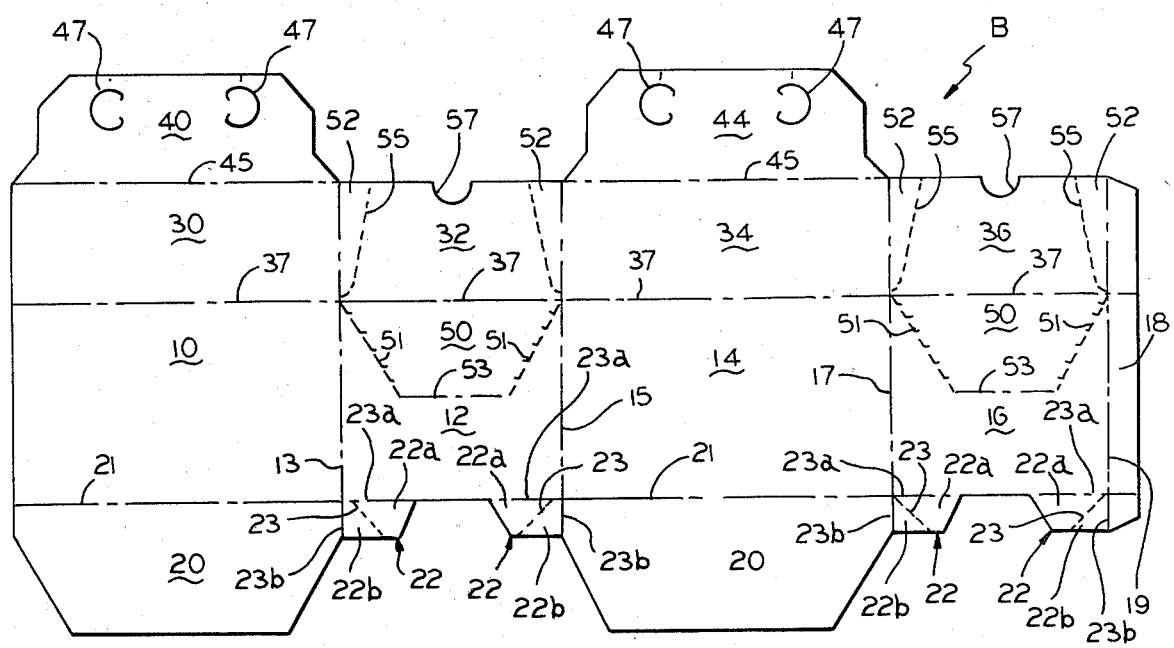
FIG. 1 is a plan view of blank of foldable sheet material, such as paperboard, from which the carton illustrated in the other views may be formed.
Figure 2:
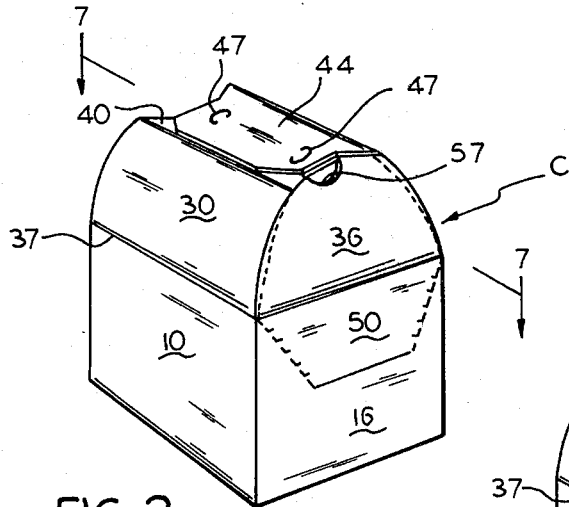
FIG. 2 is a perspective view of a completely closed carton formed from the blank of FIG. 1 and embodying features of the invention.
Figure 3:
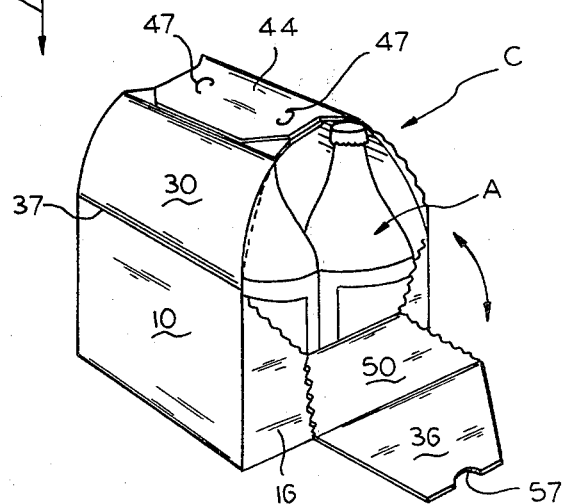
FIG. 3 is a view similar to FIG. 2 but showing portions of the structure removed to provide access to the interior of the carton.

Referring now to the drawings for a better understanding of the invention, it will be seen that the carrier carton, indicated generally at C in FIGS. 2 and 3, is adapted to hold a plurality of articles A, such as beverage bottles and may be formed from a unitary blank B of foldable sheet material illustrated in FIG. 1.

As best seen in FIG. 1 the body portion of the carton includes a first side wall panel 10, a first end wall panel 12, a second side wall panel 14, a second end wall panel 16, and a glue flap 18, which are foldably joined to each other along fold lines 13, 15, 17, and 19 to form a tubular structure open at the top and bottom.

Closure of the bottom of the carton is accomplished by a pair of bottom closure flaps 20 which are foldably joined along fold lines 21 to the lower edges of first and second side wall panels 10 and 14, respectively. Bottom closure flaps 20 may also be joined to adjacent end wall panels 12 and 16 and glue flap 18 by means of relatively small gusset members 22, each of which includes a pair of generally triangular gusset elements 22a and 22b which are foldably joined to each other along a diagonal fold line 23 and which are foldably joined to related end walls and bottom closure flaps along fold lines 23a and 23b, respectively.

As can best be seen in FIG. 7, there is shown a horizontal cross-sectional view illustrating the gusset elements 22a and 22b in the fully assembled condition.

The body walls of the carton have upper portions which, as hereinafter described, are seen to curve inwardly toward the top wall of the carton.

These upper sections designated as first side wall upper section 30, first end wall upper section 32, second side wall upper section 34, and second end wall upper section 36 are foldably joined to their related side and end wall panels along aligned fold lines 37.

Closure of the top of the carton is accomplished by a pair of first and second top wall panels or closure flaps 40 and 44 which are foldably joined along fold lines 45 to the upper edges of first and second side wall upper sections 30 and 34, respectively.

Top closure panels 40 and 44 are provided with aligned curved cuts 47 which define finger openings for lifting and carrying the carton when it is in the closed position, as illustrated in FIG. 2.

As best seen in FIGS. 1 and 3, each of the end wall lower sections has a relatively large detachable portion 50 which is defined by downwardly converging cut lines 51 and a lower fold line 53. Detachable portion 50 is of course foldably joined to the upper section of the end wall panel on the fold line 37.

The major portions of the end wall upper sections 32 and 36 are separated from relatively narrow side portions 52 by cut lines 55, so that they can be detached together with sections 52, as best seen in FIG. 3, to provide access to the interior of the carton, without destroying the integrity of the carton for reuse. Sections 32 and 36 may each be provided with a cutout 57 to facilitate grasping of the section to detach it.

Referring now to FIGS. 4–6 it will be seen that a slightly modified form of the invention is shown.

It will be understood that all of the elements of the structure which correspond to elements of the previously described embodiment have been identified by similar numerals.

The only difference in the embodiment of FIGS. 4–6 is that detachable sections 150 are completely detachable and not hinged to the end panels, also the cuts 157, to provide a means to grasp the detachable section are on the bottom rather than the top of the section.

This permits access to the carton, so that it is possible to remove the contents from the carton. At the same time it does not destroy the total integrity of the carton which may be reused to return empty bottles for their reuse.

Thus it will be understood that the carton provides a novel structure which is light-tight so as to shield the contents of the carton from light, but which at the same time has portions removable to provide access to the interior of the carton without destroying the carton for its reuse.

What is claimed is:

1. A fully enclosed article carrier carton, formed of a unitary blank of foldable paperboard, and having removable portions to provide access to the contents of the carton without destroying the integrity of the carton for reuse with empty bottles, said carton comprising:

(a) opposed pairs of side and end wall panels foldably joined to each other to form a tubular structure open at the top and bottom;
   (b) said side and end wall panels including upper and lower sections separated from each other by horizontally disposed fold lines;
   (c) bottom closure flaps foldably joined to said lower sections of said side wall panels and secured to each other in at least partially overlapped relation closing the bottom of said structure;
   (d) top closure flaps foldably joined to said upper sections of said side wall panels and secured to each other in at least partially overlapped relation closing the top of said structure; and
   (e) portions of said end wall upper and lower sections forming detachable portions being joined to the remaining portions thereof by weakened lines of tear permitting said detachable portions to be detached from said remaining portions to provide access to the contents of the carton without destroying the integrity of the center so that it can have limited reuse.

2. A carton according to claim 1 including gusset panel means foldably joining end edges of said bottom closure flaps to adjacent lower edges of related end walls.

3. A carton according to claim 1, wherein said detachable portions remain foldably attached to respective end walls after being detached along said weakened lines of tear.

4. A carton according to claim 1, wherein said detachable portions may be completely removed from said carton.

* * * * *